(12) United States Patent
Kanto (10) Patent No.: US 9,239,219 B2
(45) Date of Patent: Jan. 19, 2016

(54) FORM MEASURING APPARATUS, METHOD FOR MEASURING FORM, METHOD FOR MANUFACTURING STRUCTURE AND NON-TRANSITORY COMPUTER READABLE MEDIUM STORING A PROGRAM FOR SETTING MEASUREMENT AREA

(71) Applicant: NIKON CORPORATION, Chiyoda-ku, Tokyo (JP)

(72) Inventor: Kenta Kanto, Tokyo (JP)

(73) Assignee: NIKON CORPORATION, Tokyo (JP)

(*) Notice: Subject to any disclaimer, the term of this patent is extended or adjusted under 35 U.S.C. 154(b) by 272 days.

(21) Appl. No.: 13/871,203

(22) Filed: Apr. 26, 2013

(65) Prior Publication Data

US 2013/0298415 A1 Nov. 14, 2013

Related U.S. Application Data (63) Continuation of application No. PCT/JP2011/074854, filed on Oct. 27, 2011.

(30) Foreign Application Priority Data

Oct. 27, 2010 (JP) ................................ 2010-241340

(51) Int. Cl.
*G01B 5/004* (2006.01)
*G01B 5/008* (2006.01)
(Continued)

(52) U.S. Cl.
CPC ............... *G01B 5/008* (2013.01); *G01B 11/24* (2013.01); *G01B 21/20* (2013.01); *G01B 21/04* (2013.01); *G01B 21/045* (2013.01); *Y10T 29/49718* (2015.01); *Y10T 29/49771* (2015.01)

(58) Field of Classification Search
CPC ....... G01B 5/008; G01B 21/04; G01B 21/045
USPC ............................................. 33/503; 382/141
See application file for complete search history.

(56) References Cited

U.S. PATENT DOCUMENTS 4,483,079 A * 11/1984 Band et al. ..................... 33/503
5,125,035 A * 6/1992 McCarthy et al. ............ 382/141
(Continued)

FOREIGN PATENT DOCUMENTS

JP   2006-138782   6/2006
JP   2009-551537   1/2009
(Continued)

OTHER PUBLICATIONS

Notice of Reasons for Rejection issued by the Japanese Patent Office in corresponding Japanese Patent Application No. 2012-540941, mailed Dec. 3, 2013, 6 pages.
(Continued)

*Primary Examiner* — Laura Martin
*Assistant Examiner* — Rhyan C Lange
(74) *Attorney, Agent, or Firm* — Finnegan, Henderson, Farabow, Garrett & Dunner, LLP (57) ABSTRACT

There is provided a form measuring apparatus which is configured to perform measurement of a surface form of a surface of an object to be inspected having a three-dimensional shape, the form measuring apparatus including: a detecting section which performs detection of the surface form of the surface of the object having the three-dimensional form; and an area-setting section which sets, as a measurement area, an adjacent area adjacent to a designated area, based on form information of a form of the designated area.

27 Claims, 6 Drawing Sheets

(51) Int. Cl.
    *G01B 11/24*     (2006.01)
    *G01B 21/20*     (2006.01)
    *G06K 9/00*     (2006.01)
    *G01B 21/04*     (2006.01)

(56) References Cited

U.S. PATENT DOCUMENTS

| | | | |
|---|---|---|---|
| 7,392,692 B2 * | 7/2008 | Noda | 73/105 |
| 2005/0283989 A1 * | 12/2005 | Pettersson | 33/502 |
| 2008/0065341 A1 * | 3/2008 | Ishikawa et al. | 702/95 |
| 2010/0014099 A1 * | 1/2010 | Christoph et al. | 356/602 |
| 2010/0112190 A1 * | 5/2010 | Drewett et al. | 427/9 |
| 2010/0142798 A1 * | 6/2010 | Weston et al. | 382/141 |
| 2010/0329538 A1 * | 12/2010 | Remillard | 382/141 |
| 2012/0194651 A1 | 8/2012 | Kanto et al. | |

FOREIGN PATENT DOCUMENTS

| | | |
|---|---|---|
| JP | 2010-160084 | 7/2010 |
| JP | 2010-216939 | 9/2010 |
| WO | WO 2009/096422 | 8/2009 |

OTHER PUBLICATIONS

International Search Report from Japanese Patent Office of PCT International Application No. PCT/JP2011/074854, mailed Jan. 10, 2012.

First Official Letter for Chinese Patent Application No. 201180051998.2 issued from the State Intellectual Property Office of P.R. China on Jan. 7, 2015.

Official Letter for Taiwan Patent Application No. 100139262 issued from the Taiwan Intellectual Property Office on Jan. 13, 2015.

Notice of Preliminary Rejection mailed Dec. 24, 2014 in corresponding Korean Patent Application No. 10-2013-7013485.

* cited by examiner

FORM MEASURING APPARATUS, METHOD FOR MEASURING FORM, METHOD FOR MANUFACTURING STRUCTURE AND NON-TRANSITORY COMPUTER READABLE MEDIUM STORING A PROGRAM FOR SETTING MEASUREMENT AREA

CROSS-REFERENCE TO RELATED APPLICATION

This application is a continuation application of International Patent Application No. PCT/JP2011/074854 filed on Oct. 27, 2011 claiming the benefit of priority of Japanese Patent Application No. 2010-241340 filed on Oct. 27, 2010 and the disclosures of Japanese Patent Application No. 2010-241340 and International Patent Application No. PCT/JP2011/074854 are incorporated herein by reference in their entities.

BACKGROUND

1. Field of the Invention

The present invention relates to a form measuring apparatus, a form measuring method, a method for manufacturing a structure, and a computer-readable medium storing a program for setting a measurement area.

2. Description of the Related Art

Among form measuring apparatuses (coordinate-measuring apparatuses) measuring the three-dimensional form or the three-dimensional profile of an object to be measured, there is a form measuring apparatus which maintains a distance from a detecting section to the object and which performs measurement while moving the detecting section along the form of the object (see, for example, Japanese Patent Application Laid-open No. 2010-160084). As such a method for measuring the three-dimensional form, there is known the optical cutting method for measuring the three-dimensional shape of an object, the method including irradiating a slit light onto the object, and measuring the three-dimensional form of the object from an optical cutting line formed corresponding to the cross-sectional shape of the object. Further, in the recent years, there is a demand that even an object having a complex form is measured with enhanced precision. In a coordinate-measuring apparatus adaptable for realizing such a demand performs a teaching processing to resister a measurement area, before measuring the three-dimensional form of an object, so as to enhance the accuracy and efficiency of the measurement.

SUMMARY

An embodiment of the present teaching is a form measuring apparatus which performs measurement of a surface form of a surface of an object having a three-dimensional form, the apparatus characterized by comprising:

a detecting section which performs detection of the surface form of the object having the three-dimensional form; and an area-setting section which sets, as a measurement area, an adjacent area adjacent to a designated area, based on form information of a form of the designated area.

DESCRIPTION OF THE EMBODIMENTS

For example, the coordinate-measuring apparatus described in Japanese Patent Application Laid-open No. 2010-160084 performs position control based on a plurality of orthogonal axes and a plurality of rotational axes to thereby control the arrangement of the detecting section relative to the object. Accordingly, every time the object is rotated, the optimal positions for the detecting section and the object are consequently changed as well. A user performs a teaching operation for registering a measurement position with respect to the object in the coordinate-measuring apparatus, while considering a measurement condition suitable for the measurement in the coordinate-measuring apparatus. Therefore, the teaching operation for storing the procedure for moving the measurement position while controlling the posture and/or orientation of the object has been difficult. In particular, in a measurement based on, for example, the optical cutting method capable of performing measurement with enhanced precision, it is possible to realize measurement with further enhanced precision by optimizing the arrangement of the detecting section relative to the object. Accordingly, in a case that the demand for the posture during measurement is high, the teaching operation becomes more difficult.

Further, when performing the teaching operation while confirming the state of the object, it is not possible in some cases to make the confirmation, in registering of measurement start position and measuring end position, by irradiating the slit light onto the object. In such measurement start and finish positions, the user has no option but to perform the teaching operation while imagining an approximate or rough position and an approximate or rough posture of the object. Measurement performed based on approximate position and approximate posture in such a manner is consequently not accurate, and further the teaching operation itself requires a very long period of time. Accordingly, the teaching operation in the conventional coordinate-measuring apparatus is based on the operation procedure as described above, and has such a problem that the processing for setting the measurement area with respect to the object cannot be simplified.

The present teaching has been made in view of the above problem, and an object of the present teaching is to simplify a setting processing (teaching processing) of setting a measurement area with respect to the object.

In the following, an embodiment of the present teaching will be explained in detail with reference to the drawings. In the embodiment of the present teaching, an area (adjacent area) which is adjacent to a predetermined designated area is set as a measurement area, based on a form measurement data indicating or showing a surface form or a surface profile detected in the designated area.

Figure 1:
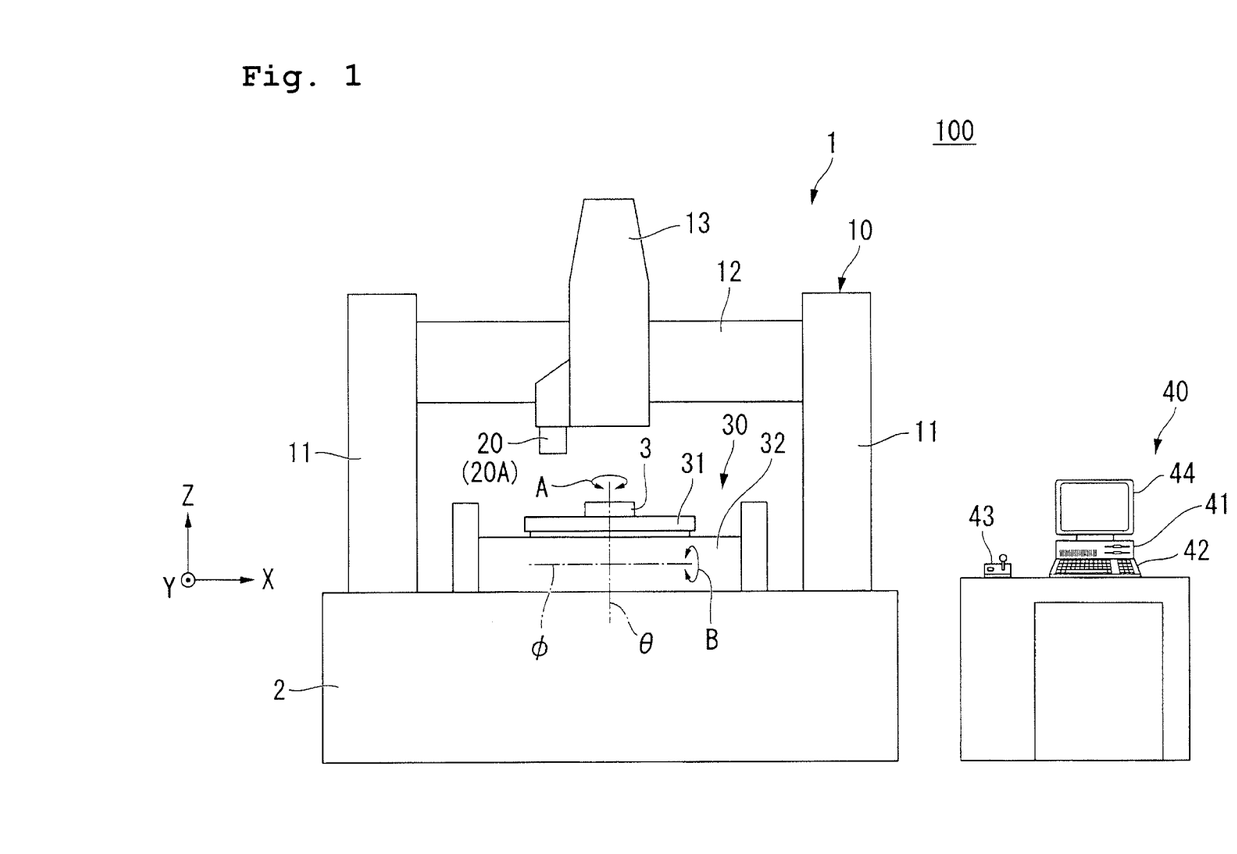
FIG. 1 is a view schematically showing the overall configuration of a three-dimensional form measuring apparatus (coordinate-measuring apparatus) according to an embodiment of the present teaching.
Figure 2:
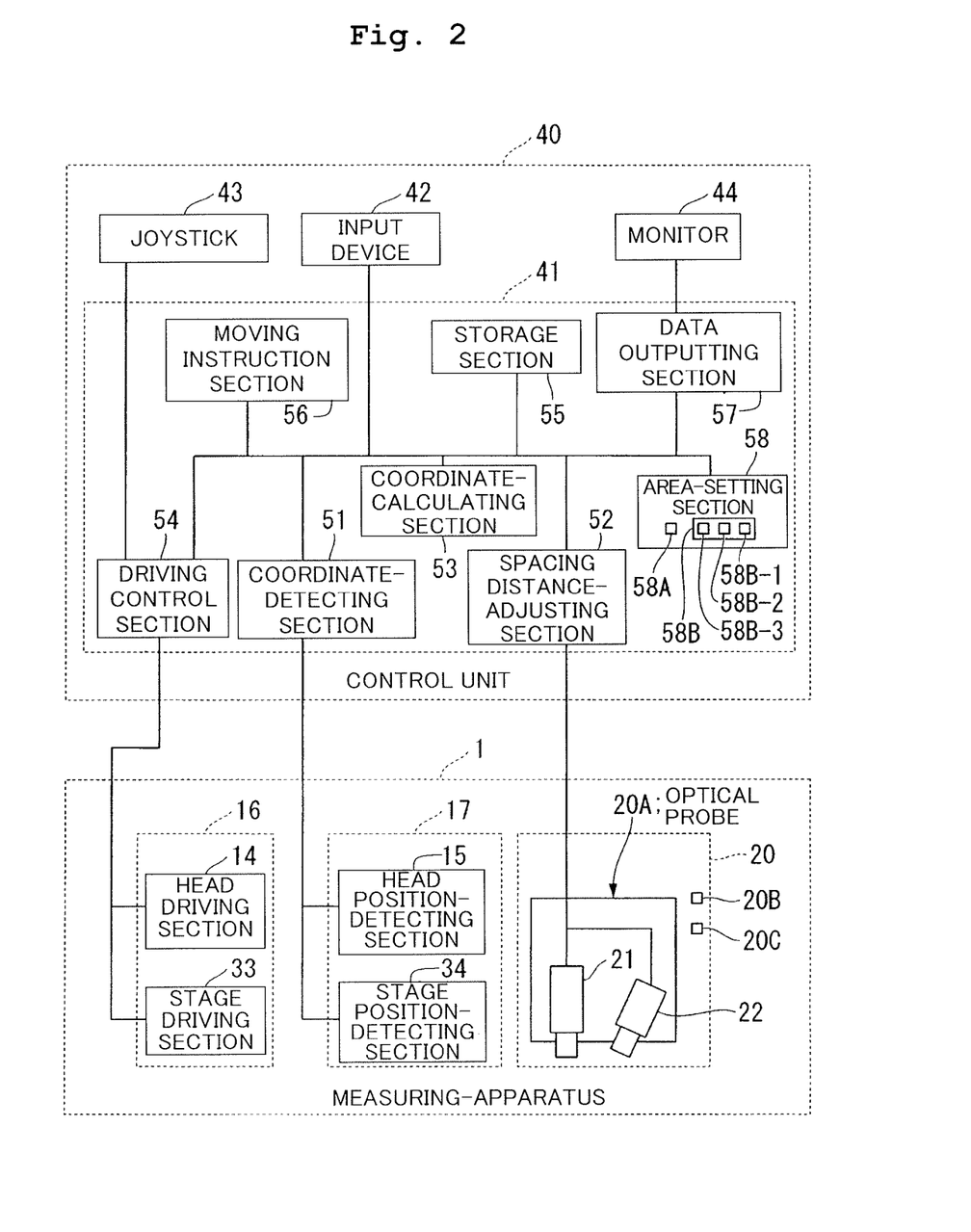
FIG. 2 is a block diagram of a body of the measuring apparatus (measuring-apparatus body) in the embodiment.

FIG. 1 is a view schematically showing the overall configuration of a three-dimensional form measuring apparatus (referred to as a three-dimensional profile measuring apparatus, or a coordinate-measuring apparatus) 100 according to an embodiment of the present teaching. The three-dimensional form measuring apparatus (coordinate-measuring apparatus) 100 is provided with a body 1 of the measuring apparatus (measuring-apparatus body 1), and a control unit 40 (FIG. 2). FIG. 2 is a block diagram of the apparatus body 1 and the control unit 40 according to the embodiment of the present teaching. As shown in FIG. 1, the measuring-apparatus body 1 is provided with a base 2 having a level upper surface (reference surface) provided thereon, a portal-shaped structure 10 which is provided on the base 2 and which supports a measuring head 13, and a supporting device 30 which is provided on the base 2 and on which an object 3 is placed. An orthogonal coordinate system is defined with the reference surface of the base 2, as the reference. X-axis and Y-axis are defined parallel to the reference surface, and Z-axis is defined in a direction orthogonal to the reference surface. The base 2 is provided with guide rails (not shown) which extend in Y direction (direction orthogonal to the sheet surface of the drawing, and designated as the "front/rear direction"). The form of the object can be clarified by measuring the form of the object 3.

The portal-shaped structure 10 is provided with a pair of struts 11 which are disposed to be movable in the Y direction on the guide rails provided on the base 2, and a horizontal frame 12 which is bridged between the pair of struts 11 so as to extend horizontally. Further, the portal-shaped structure 10 is provided with a carriage (not shown) disposed on the horizontal frame 12 to be movable in the X-direction (left/right direction); and the measuring head 13 is provided on the portal-shaped structure 10 to be movable in the Z-direction (up/down direction) with respect to the carriage. A detecting section 20 which detects the form of the object 3 is provided on the measuring head 13 at a lower portion thereof. The detecting section 20 is supported by the measuring head 13 and detects the distance between the measuring head 13 and the object 3 which is arranged below or under the detecting section 20. The position of the detecting section 20 can be moved by controlling the position of the measuring head 13. Further, a head driving section 14 (FIG. 2) and a head position-detecting section 15 (FIG. 2) are provided inside the portal-shaped structure 10. The head driving section 14 electrically moves the measuring head 13 in three directions (X, Y, Z directions) based on a driving signal inputted to the head driving section 14, and the head position-detecting section 15 detects the coordinates of the measuring head 13 and outputs a signal indicating or representing the coordinate value of the measuring head 13.

The supporting device 30 is provided on the base 2. The supporting device 30 is provided with a stage 31 on which the object 3 is placed, and a support table 32 which supports the stage 31 to be rotatable (swingable, rockable) about the rotational axes of two mutually orthogonal directions. The support table 32 supports the table 31 to be rotatable (swingable, rockable) in a horizontal plane about a rotational axis θ extending perpendicularly (in the Z-axis direction) and to be rotatable (swingable, rockable) about a rotational axis Φ extending horizontally (in the X-axis direction). Further, the supporting device 30 is provided with a stage driving section 33 (FIG. 2) which electrically rotates and drives the stage 31 in each of the rotational axes θ and Φ based on a driving signal inputted to the supporting device 30, and a stage position-detecting section 34 (FIG. 2) which outputs a signal indicating a stage coordinate value of the stage 31.

The control unit 40 is provided with a control section 41, an input device 42, a joystick 43 and a monitor 44. The control section 41 controls the measuring-apparatus body 1, the detail of which will be described later on. The input device 42 is, for example, a keyboard via which various kinds of instruction information are inputted, etc. The joystick 43 is an input device via which information designating the position of the measuring head 13 and information designating the rotational position of the stage 31 are inputted. The monitor 44 displays a measurement screen, an instruction screen, a measurement result, etc. Note that the joystick 43 can be replaced with another appropriate input device (for example, a trackball, etc.).

Next, the configuration of the measuring-apparatus body 1 will be explained with reference to FIG. 2. The measuring-apparatus body 1 is provided with a driving section 16, a position detecting section 17 and a detecting section 20.

The driving section 16 is provided with the head driving section 14 and the stage driving section 33 described above. The head driving section 14 is provided with a Y-axis motor which drives the struts 11 in the Y direction, an X-axis motor which drives the carriage in the X direction, and a Z-axis motor which drives the measuring head 13 in the Z direction. The head driving section 14 receives a driving signal supplied from a driving control section 54 (to be described later on). The head driving section 14 electrically drives the measuring head 13 in the three directions (X, Y, and Z directions) based on the driving signal.

The stage driving section 33 is provided with a rotary shaft motor which drives and rotates the stage 31 about the rotational axis θ, and a tilt shaft motor which drives and rotates the stage 31 about the rotational axis Φ. The stage driving section 33 receives a driving signal supplied from the driving control section 54. The stage driving section 33 electrically rotates the stage 31 in each of the rotational axis θ and the rotational axis Φ, based on the driving signal.

The position detecting section 17 is provided with the head position-detecting section 15 and the stage position-detecting section 34 as described above. The head position-detecting section 15 is provided with an X-axis encoder, a Y-axis encoder and a Z-axis encoder which detect the positions of the measuring head 13 in the X-axis, Y-axis and Z-axis directions, respectively. The head position-detecting section 15 detects the coordinates of the measuring head 13 with these encoders, and supplies a signal indicating the coordinate value of the measuring head 13 to a coordinate-detecting section 51 (to be described later on).

The stage position-detecting section 34 is provided with a rotary shaft encoder and a tilt-axis encoder which detect the rotational positions of the stage 31 about the rotational axis θ and the rotational axis Φ, respectively. The stage position-detecting section 34 uses these encoders to detect the rotational positions of the stage 31 about the rotational axes θ and Φ, and supplies a driving signal indicating the detected rotational positions to the coordinate-detecting section 51.

The detecting section 20 detects a surface form (or surface profile) of the surface of the object 3 having a three-dimensional form or profile. The detecting section 20 is provided with at least one of first to third detecting means described below. The first detecting means is provided with an optical probe 20A of an optical cutting system and uses the optical probe 20A to detect the surface form of the object 3. The optical probe 20A is configured to include a slit-light irradiating section (irradiating section) 21 and an imaging section 22 so as to obtain the surface form of the object 3 with the optical cutting method. The slit-light irradiating section (irradiating section) 21 irradiates a linear slit light (line-shaped light) onto the object 3, based on a control signal which is supplied from a spacing distance-adjusting section 52 (to be described later on) and which controls the irradiation of light, so that a linear light is irradiated onto the object 3. The imaging section 22 is arranged with respect to the irradiation direction of the slit-light irradiating section 21 so that the optical axis of the imaging section 22 is shifted with respect to the optical axis of the slit-light irradiating section (irradiating section) 21 by a predetermined angle. The imaging section 22 images (takes an image of) an optical cutting line formed by the irradiation light from the slit-light irradiating section (irradiating section) 21 (a portion of the surface of the object 3 at which the slit light is irradiated). Here, the optical cutting line is formed depending on the cross-sectional form or profile of the object 3. The imaging section 22 takes an image of a shading pattern formed on the surface of the object 3, and supplies information about the taken image to the spacing distance-adjusting section 52. With this, the control unit 40 obtains form measurement data. The imaging section 22 is provided with a solid-state image sensing device such as a CCD (Charge Coupled Device) sensor, a C-MOS (Complementary Metal Oxide Semiconductor) sensor, etc.

The second detecting means is provided with a SFF probe 20B of obtained-image transforming type, and uses the SFF probe 20B to perform the detection. The SFF probe 20B takes an image of the form of the object 3 and supplies image data of the taken image to the spacing distance-adjusting section 52. With this, the control unit 40 obtains form measurement data based on the image data of the taken image of the form of the object 3. For detailed explanation regarding the SFF probe 20B, see, for example, the following reference literature ([Reference Literature: Pamphlet of International Publication No. WO2009/096422). The third detecting means is provided with a contact probe 20C of contact type, and uses the contact probe 20C to perform the detection. The contact probe 20C makes contact with the object 3 to thereby detect information (positional information) of the object 3 and supplies the obtained information (positional information) to the spacing distance-adjusting section 52. With this, the control unit 40 obtains form measurement data. It is allowable that the detecting section 20 is provided with a plurality of detecting means, instead of any one of the detecting means described above, and that the detecting section 20 makes detection by a selected detecting means among the plurality of detecting means. In the following, the optical probe 20A will be explained as an example.

Next, the control unit 40 will be explained. The input device 42 is provided with a keyboard, etc. via which a user inputs various kinds of instruction information. The input device 42 detects inputted instruction information, and causes the detected instruction information to be written and stored in a storage section 55. The joystick 43 receives an operation by the user and generates, depending on the user's operation, a control signal for driving the measuring head 13 and/or the stage 31 and supplies the control signal to the driving control section 54. In such a manner, the joystick 43 can detect the information indicating a state in which the optical probe 20A is to be arranged in a designated area, and the joystick 43 can make input, as control instruction information for arranging the optical probe 20A, based on the detected information. The monitor 44 receives measurement data (coordinate values of all of the measurement points), etc. supplied from a data outputting section 57. The monitor 44 displays the received measurement data (the coordinate values of all of the measurement points), etc. Further, the monitor 44 displays a measurement screen, an instruction screen, etc.

The control section 41 is provided with a coordinate-detecting section 51, the spacing distance-adjusting section 52, a coordinate-calculating section 53, a driving control section 54, the storage section 55, a moving instruction section 56, the data outputting section 57 and an area-setting section 58.

The coordinate-detecting section 51 detects the positions of the optical probe 20A and the stage 31 based on a coordinate signal outputted from the head position-detecting section 15, namely detects an observation position (optical axis-center position) in the horizontal direction and an observation position in the up/down direction of each of the optical probe 20A and the stage 31. Further, the coordinate-detecting section 51 detects the rotational positions of the stage 31 about the rotational axes θ and Φ, based on the signal inputted from the stage position-detecting section 34 and indicating the rotational positions. The coordinate-detecting section 51 detects the coordinate information based on the information of the observation position in the horizontal direction (optical axis-center position) and the information of the observation position in the up/down direction detected respectively, and based on the information indicating the rotational position (information of the rotational position of the stage 31) outputted from the stage position-detecting section 34. Further, the coordinate-detecting section 51 supplies the coordinate information of the optical probe 20A and the coordinate information and rotational position information of the stage 31 to the coordinate-calculating section 53. Further, the coordinate-detecting section 51 detects a relative moving route via which the optical probe 20A is moved relative to the stage 31, the moving speeds of the optical probe 20A and the stage 31, etc., based on the coordinate information of the optical probe 20A and the coordinate information and the rotational position information of the stage 31.

The spacing distance-adjusting section 52 reads data designating sampling frequency, from the storage section 55 before starting the measurement of coordinates. The spacing distance-adjusting section 52 receives image information from the imaging section 22 at the sampling frequency.

The coordinate-calculating section 53 receives image information which is supplied from the spacing distance-adjusting section 52 and in which frames are thinned out. The coordinate-calculating section 53 receives the coordinate information of the optical probe 20A and the rotational position information of the stage 31 which are supplied from the coordinate-detecting section 51. The coordinate-calculating section 53 calculates point cloud data of the coordinate value (three-dimensional coordinate value) of each of the measurement points based on the image information supplied from the spacing distance-adjusting section 52, the coordinate information of the optical probe 20A and the rotational position information of the stage 31.

Specific calculating method is as follows. At first, the coordinate-calculating section 53 calculates the coordinates of each of the slit light-irradiating section 21 and the imaging section 22, which are fixed to the optical probe 20A, based on the received coordinates of the optical probe 20A. Here, since the slit light-irradiating section (irradiating section) 21 is fixed to the optical probe 20A, the irradiation angle of the slit light-irradiating section (irradiating section) 21 is fixed with respect to the optical probe 20A. Further, the imaging section 22 is also fixed to the optical probe 20A, the imaging angle of the imaging section 22 is fixed with respect to the optical probe 20A.

The coordinate-calculating section 53 calculates, for each of the pixels of the taken image, a point at which the irradiated light is irradiated onto the object 3 by using the triangulation. Here, the coordinates of the point at which the irradiated light hits the object 3 is the coordinates of a point at which a straight line drawn from the coordinates of the slit light-irradiating section 21 by the irradiation angle of the irradiating section 21 intersects with a straight line (optical axis) drawn from the coordinates of the imaging section 22 by the imaging angle of the imaging section 22. Note that the taken image described above indicates an image detected by the optical probe 20A arranged at the measurement position. With this, it is possible to calculate the coordinates of the position at which the light is irradiated by scanning the slit light, irradiated onto the object, in a predetermined direction. Further, the object 3 is supported by the stage 31. By the rotation of the stage 31 about the rotational axis, the object 3 is rotated together with the stage 31 about the rotational axis. Namely, the calculated coordinates of the position at which the light is irradiated are information indicating the position of the surface of the object 3 of which posture is inclined by the rotation of the stage 31 about the rotational axis. Accordingly, by correcting the coordinates of the position, at which the light is irradiated, based on the inclination of the stage 31, namely based on the rotational position information of the stage 31 about the rotational axis, it is possible to obtain the actual surface form of the object 3. Further, the coordinate-calculating section 53 stores the calculated point cloud data of the three-dimensional coordinate values in the storage section 55.

The storage section 55 stores or retains the various kinds of instruction information supplied from the input device 42 as a measurement condition table. Here, the measurement condition table is provided with items including: predetermined moving instruction data such as measurement condition, measurement procedure, etc.; data indicating the coordinate values of the measurement points in the designated area indicating the measurement position of the object 3 and the measurement procedure and the rotational position of the stage 31; data indicating coordinate value of a measurement start point Ps (first measurement point) and a measurement end point Pe (last measurement point) of the object 3, etc.; data indicating a measurement target direction at the measurement start position and the spacing distance between the respective measurement points (for example, a measurement pitch having a constant spacing distance); and the like. Further, the measurement condition table is provided with an item of data indicating a measurement start margin and a measurement end margin defining the range of the measurement area when calculating the measurement area based on the measurement point information showing the designated area, while making the item to be corresponded to identification information indicating the designated area.

For example, the coordinate values of the measurement points in the designated area indicating the measurement position of the object 3 and the measurement procedure and the rotational position of the stage 31 are calculated by the procedure shown next. The coordinate values of the measurement points and the rotational position of the stage 31 are calculated, for each of the measurement points designating the designated area of the object 3, based on positions at which the object 3 and the optical probe 20A are positioned, respectively, by driving the measuring head 13 and the stage 31 based on the information inputted by the user, so that the object and the optical probe 20A are positioned while having desired postures, respectively. More specifically, the coordinate-calculating section 53 calculates the coordinate value of each of the measurement points based on the coordinate value (three-dimensional coordinate value) of each of the measurement points supplied from the driving control section 54. The coordinate value of each of the measurement points calculated by the coordinate-calculating section 53 is calculated at positions at which the object 3 and the optical probe 20A are positioned, respectively, by operating in advance the joystick in addition to a key input operation of inputting the coordinate value with the input device 42, so as to drive the measuring head 13 and the stage 31 so that the object 3 and the optical probe 20A has desired postures, respectively.

The coordinate-detecting section 51 detects the coordinate information of the optical probe 20A in a state that the optical probe 20A has a posture when positioned as describe above, and detects the rotational position information of the stage 31, and supplies the coordinate information of the optical probe 20A and the rotational position information of the stage 31 to the coordinate-calculating section 53. The coordinate-calculating section 53 writes and stores the coordinate information of the optical probe 20A and the rotational position information of the stage 31 in the storage section 55. Further, the coordinate values of the measurement start point Ps (first measurement point) and the measurement end point Pe (last measurement point) of the object 3, etc. are generated by the area-setting section 58 based on the coordinate values of the measuring points in the designated area of the object 3, and are written in the storage section 55 by the area-setting section 58.

Further, the storage section 55 retains the point cloud data of the three-dimensional coordinate values supplied from the coordinate-calculating section 53 as the measurement data. Furthermore, the storage section 55 retains the point cloud data of the coordinate values (three-dimensional coordinate values) of the respective measurement points supplied from the coordinate-detecting section 51. Moreover, the storage section 55 retains the design data (CAD data).

The driving control section 54 outputs a driving signal to the head driving section 14 and the stage driving section 13 based on an operation signal from the joystick 43, or based on an instruction signal from the moving instruction section 56, to drive and control the measuring head 13 and the stage 31. Further, the driving control section 54 writes and stores the positional information of the measuring head 13 and the positional information of the stage 31, which are set as the registered positions thereof respectively, in the storage section 55, based on the operation signal from the joystick 43. Namely, the driving control section 54 is capable of indirectly obtaining the position of the optical probe 20A supported by the measuring head 13.

The moving instruction section 56 reads, from the storage section 55, the measurement start point Ps (first measurement point) and the measurement end point Pe (last measurement point) of the object 3, etc. registered in the measurement condition table. The moving instruction section 56 calculates a moving route of the scanning with respect to the object 3 from the measurement start point Ps and the measurement end point Pe of the object 3. The moving instruction section 56 transmits, via the driving control section 54, a moving instruction to the head driving section 14 and the stage driving section 33 so as to drive the measuring head 13 and the stage 31 in accordance with the calculated moving route. Further, the moving instruction section 56 supplies a control signal to the spacing distance-adjusting section 52 based on the moving instruction, etc., to thereby control an optical system of the optical probe 20A.

The data outputting section 57 reads the measurement data (coordinate values of all of the measuring points), etc. from the storage section 55. The data outputting section 57 supplies the measurement data (coordinate values of all of the measuring points), etc. to the monitor 44. Further, the data outputting section 57 outputs the measurement data (coordinate values of all of the measuring points), etc. to a printer (not shown).

The area-setting section 58 sets an adjacent area, which is adjacent to a predetermined designated area, based on a form measurement data in accordance with the surface form detected in the predetermined designated area. The form measurement data in accordance with the surface form detected in the designated area is stored in the storage section 55 by the user's operation. The area-setting section 58 calculates the measurement area based on the form measurement data in the designated area stored in the storage section 55 and based on information indicating a range which is previously set and in which the measurement area is to be extended.

The area-setting section 58 is provided with an internal-interpolation processing section 58A and an external-interpolation (extrapolation) processing section 58B. The internal-interpolation processing section 58A obtains the form measurement data by means of the internal-interpolation processing based on a form measurement data detected while moving the detecting section relative to and along the surface of the object 3. The internal-interpolation processing section 58A writes and stores the obtained form measurement data in the storage section 55 while associating the obtained form measurement data with identification information which is set depending on the order of measurement.

The external-interpolation processing section 58B performs the external-interpolation processing based on the obtained form measurement data stored in the storage section 55 and based on the form measurement data obtained by the internal-interpolation processing. The external-interpolation processing section 58B calculates an outside area located at the outside of the designated area by means of the external-interpolation processing based on the obtained form measurement data and the form measurement data obtained by the internal-interpolation processing. The external-interpolation processing section 58B calculates a curve line which is approximate to (curve line fitted to) the surface form of the object 3 based on a form measurement data of a portion in the vicinity of an end portion of the designated area, and determines an extending direction of the outside area based on the calculated approximate curve line. The approximate curve line is calculated by any one of calculating sections 58B-1 to 58B-3 described below.

The calculating section 58B-1 (1st order differential operator section) determines the extending direction of the outside area to be a direction which is same as the inclination of the curve line in the vicinity of the end portion of the designated area. The calculating section 58B-2 (2nd order differential operator section) determines the extending direction of the outside area to be a direction in which the change amount of the inclination of the curve line in the vicinity of the end portion of the designated area is constant. The calculating section 58B-3 (linear operator section) calculates a curve line approximate to the surface form of the object 3 by means of the collinear approximation and determines the extending direction of the outside area located at the outside of the designated area, to be a direction in which a straight line obtained by the collinear approximation is extended. In such a manner, the external-interpolation processing section 58B is provided with the plurality of calculating sections and thus is capable of calculating an approximate curve line suitable to the surface form of the object 3.

Further, the external-interpolation processing section 58B calculates a distance by which the measurement area is to be extended along the calculated curve line, within a range which is any one of first to third ranges shown below. The first range is defined by a distance from an end of the designated area up to a predetermined distance which is previously set. In this case, for example, the predetermined distance from the end of the designated area is previously written and stored in the storage section 55. The second range is defined by a distance until arriving at a predetermined limit area which is previously set. In this case, for example, positional information regarding the predetermined limit area is previously written and stored in the storage section 55. Alternatively, the third range is such a range up to a position at which a limit position is included, the limit position being a position at which the object 3 can exist and which is calculated based on the form information obtained by detecting the object 3 in the designated area. In this case, for example, characteristic information regarding the characteristic regarding the form of the object 3 is previously written and stored in the storage section 55. The characteristic information is, for example, length information of the object 3 in a specific direction, length variation information (length unevenness information) of the object 3, etc. The form of the object 3 is presumed based on the characteristic information and the detected form information to thereby generate presumed form information. The limit position at which the object 3 can be present is calculated based on the presumed form information.

In the area-setting section 58, the internal-interpolation processing section 58A obtains the form measurement data by the internal-interpolation processing based on the form measurement data obtained by performing detection while moving the optical probe 20A relative to and along the surface of the object 3. The external-interpolation processing section 58B is capable of extending the interpolation processing (performing external-interpolation processing or extrapolation processing) of the adjacent measurement area adjacent to the designated area, by performing the external-interpolation processing based on the obtained form measurement data and the form measurement data obtained by the internal-interpolation processing and by using the approximation precision of the approximate curve line subjected to the internal-interpolation processing. The measurement area calculated by the external-interpolation processing section 58B includes a measurement area in the vicinity of a start point at which the form detection of the object 3 is started and a measurement area in the vicinity of an end point at which the form detection of the object 3 is ended. The external-interpolation processing area 58B is set so that the measurement area in the vicinity of the start point or the measurement area in the vicinity of the end point includes the end portion of the object 3.

Figure 3:
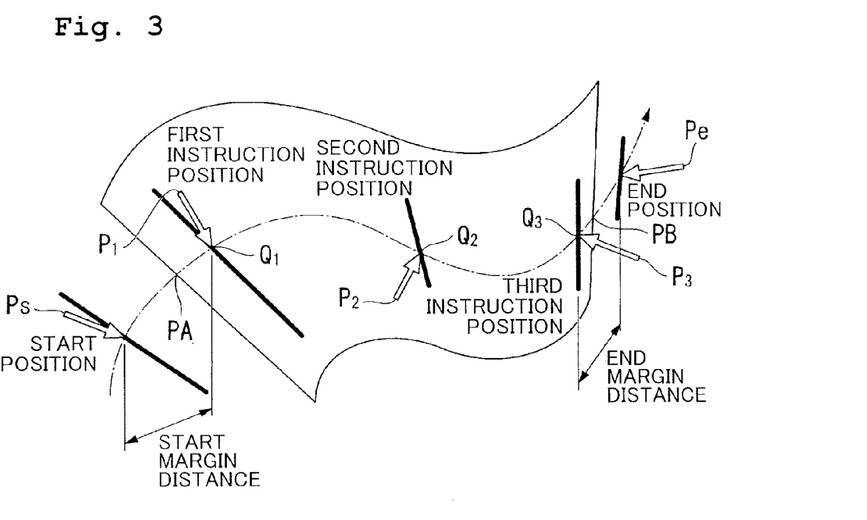
FIG. 3 is a view showing registered measurement locations with respect to an object in the embodiment.
Figure 4:
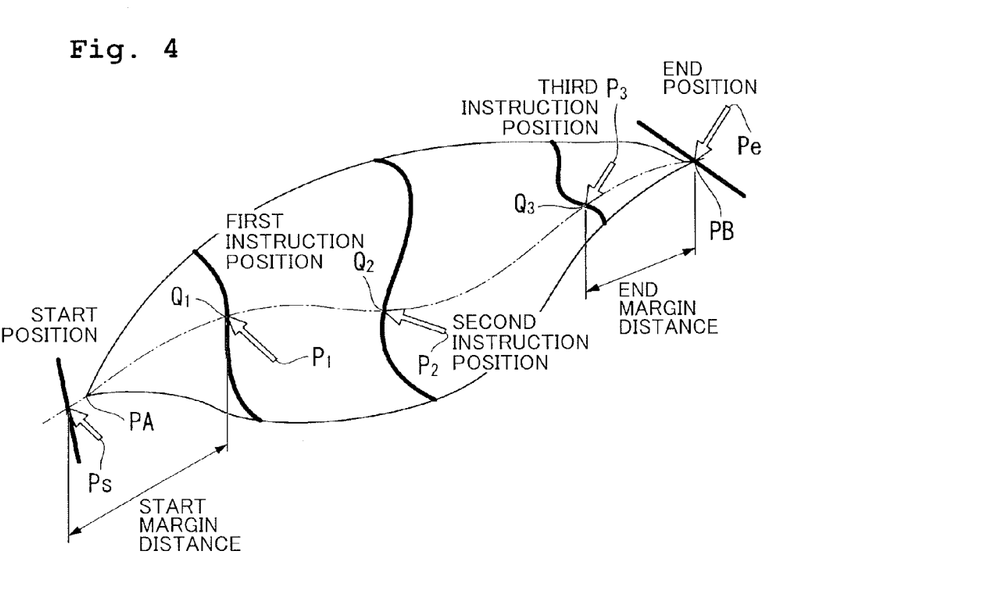
FIG. 4 is a view showing registered measurement locations with respect to another object in the embodiment, having a form different from that of the object shown in FIG. 3.

With reference FIGS. 3 and 4, the outline of the processing in the embodiment will be shown. FIG. 3 is a view showing registered measurement locations with respect to an object 3 in the embodiment. The object 3 shown in FIG. 3 has a ribbon-like form. On the surface of the object 3, n-pieces of registered measurement locations (measurement positions) are shown. Reference symbol "n" is a plurality of values which are previously determined. FIG. 3 shows a case that "n" is 3. FIG. 3 shows a direction of a line-shaped shading (solid line) formed by projecting a slit light from each of positions which are set as $(P_1, P_2 \ldots P_{(n-1)}, P_n)$, and irradiation directions (arrows) in each of which the slit light is irradiated from one of the positions $(P_1, P_2 \ldots P_{(n-1)}, P_n)$. Here, the slit light irradiated from the irradiation section 21 forms a light line orthogonal to the scanning direction when the slit light is irradiated onto a plane.

Further, FIG. 3 shows points in the vicinity of the surface of the object 3 as points $(Q_1, Q_2 \ldots Q_{(n-1)}, Q_n)$ which correspond to the set positions $(P_1, P_2 \ldots P_{(n-1)}, P_n)$, respectively. Namely, an arrow connecting two points corresponding to each other can be shown as a vector. For example, a vector $(P_1 Q_1)$ is shown as an arrow from the point $P_1$ toward the point $Q_1$ shown in the drawing. Although the arrows shown in FIG. 3 are different in length, each of the vectors (arrows) shows the irradiation direction of the slit light, and has a constant value (length). Further, it is necessary to select, as the irradiation direction of the slit light, an optimal direction depending on the state of the surface of the object. Therefore, as shown in FIG. 3, the direction of the vector (arrow) is changed depending on the state of the surface of the object. It is possible to make adjustment so that the light is not irradiated directly onto the imaging section 22 by, for example, making the direction of the vector to be parallel to the normal line of the surface of the object.

As shown in FIG. 3, the designated area is shown as a range from the position $P_1$ to the position $P_n$ in which the object 3 is present, and the user can judge, in the designated area, whether or not the slit light is projected onto the surface of the object 3 in a desired state by detecting the projection state of the slit light onto the surface of the object 3. Further, in a case that the change in the surface form of the object 3 is continuous, it is possible to make judgment that any error from the actual form is small even when any approximation of the surface form is performed between the set positions. Namely, in a case of the surface form as described above, the information between the two points can be generated from the setting information of the set positions.

In order to measure the entire form of the object 3, it is necessary to include, in the measurement area, end portions of the object 3 (end portions PA and PB) as well. On the other hand, it is difficult to determine the end portions of the object 3 in order to perform such a measurement, and thus in some cases, a designated area shown by an range from the position $P_1$ to the position $P_n$ is defined in an range which is narrower (smaller) than the entire form, and the form of the object 3 is measured with respect to a range wider (greater) than the designated area. For example, the measurement area is a range from the measurement start point Ps to the measurement end point Pe shown in FIG. 3. Locations at which the measurement start point Ps and the measurement end point Pe are located respectively are each a location at which the object 3 is not present. For example, at the measurement start point Ps and the measurement end point Pe at each of which the object 3 is not present, it is not possible to detect the irradiation state of the slit light projected onto the surface of the object, and thus it is not possible to judge whether or not the slit light is irradiated in a desired state. Accordingly, it is difficult to adjust the projection direction of the slit light at these positions. Thus, the measurement range is calculated based on the position information registered in the designated area. In this method, it is possible to calculate the measurement area based on the position information registered in the designated area, namely the projection position of the slit light adjusted to have a desired posture. Note that although a reference point as the designated area is made to be the reference coordinates of the optical probe 20A, the reference point may be set on the side of the surface of the object 3.

FIG. 4 is a view showing registered measurement locations with respect to another object in the embodiment, having a form different from that of the object shown in FIG. 3. An object 3 show in FIG. 4 has a leaf-like form. In the case of FIG. 4 also, regarding the range of the designated area, it is possible to determine whether or not the slit light is projected on the surface of the object 3 in a desired state by detecting the projection state of the slit light on the surface of the object 3, in a similar manner as regarding the case shown in FIG. 3. However, since this object 3 has the leaf-like form, tip end portions, as end portions thereof, are thin or slender. Therefore, even if the slit light is irradiated onto the end portions, it is not possible to obtain any line-shaped shading having a sufficient length at the end portions. Accordingly, this case is an example wherein even if an adjustment position is present on the surface of the object 3, for example, there is a location at which any appropriate adjustment is difficult. In view of this situation, in the case shown in FIG. 4, it is possible to perform measurement accurately by registering a designated area within a range in which line-shaped shading having sufficient length can be obtained. In the case shown in FIG. 4 also, it is possible to calculate a measurement area based on a projection position of the slit light of which posture is adjusted to be in a desired state, in a similar manner as the case shown in FIG. 3.

Next, an explanation will be given about the calculation of measurement area. The area-setting section 58 calculates the measurement area by the following two processings. In a first processing, the internal-interpolation processing section 58A in the area-setting section 58 performs internal-interpolation processing based on a form measurement data obtained by performing detection while moving the detecting section 20 relative to and along the surface of the object 3, and obtains a form measurement data which interpolates the measurement form data at a plurality of positions. In a second processing, the external-interpolation processing section 58B in the area-setting section 58 performs external-interpolation processing based on the obtained form measurement data and the form measurement data obtained by the internal-interpolation processing. In the following, the respective first and second processings will be explained.

An explanation will be given firstly about the first processing for generating an approximate curve line interpolating a range of a designated area, based on positional information registered as the designated area. At first, the detecting section 20 obtains a value of the coordinates at each of the set positions ($P_1$, $P_2$ . . . $P_{(n-1)}$, $P_n$). Regarding the value of the coordinates of each of the positions, the value of orthogonal three axes ($x_i$, $y_i$, $z_i$) and the rotational positions about the axes ($\theta_i$, $\Phi_i$) can be expressed together as in the follow expressions.

$$P_1=[x_1, y_1, z_1, \theta_1, \Phi_1]$$

$$P_2=[x_2, y_2, z_2, \theta_2, \Phi_2]$$

. . .

$$P_n=[x_n, y_n, z_n, \theta_n, \theta_n]$$

The detecting section 20 is capable of moving along the surface of the object 3 in an order starting from $P_1$ toward $P_n$, thereby making it possible to obtain the form information of the object 3.

The internal-interpolation processing section 58A calculates, at each of the set positions, an approximate curve line between the respective positions by a predetermined calculation processing. The calculation processing for calculating the approximate curve line can be selected from the Spline calculation processing, the calculation processing based on the least squares method, the calculation processing for obtaining high order approximate curve line, the linear approximation processing, etc. The calculation processing for calculating the approximate curve line is predetermined set based on the form of the object 3, the position (location) of each of the set positions, etc. The positional information to be interpolated by the internal-interpolation processing section 58A is generated depending on the measurement spacing distance of the form information detected by the detecting section 20; and in a designated measurement area, namely in the range of $P_1$ to $P_n$, it is possible to obtain necessary internal-interpolation information by the above-described internal-interpolation processing. In such a manner, it is possible to calculate the approximate curve line depending on the form of the object 3 in the designated area by the above-described internal-interpolation processing based on the approximate curve line. Note that the internal-interpolation processing can be performed by performing the processing regarding the orthogonal three axes ($x_i$, $y_i$, $z_i$) and the processing regarding the rotational positions about the axes ($\theta_i$, $\Phi_i$) independently from each other.

Next, an explanation will be given about the second processing for expanding the range of the designated area so as to also measure an adjacent area adjacent to the designated area. The external-interpolation processing section 58B performs the external-interpolation processing based on the obtained form measurement data and the form measurement data obtained by the internal-interpolation processing. In the external-interpolation processing, it is possible to select a calculating section among the calculation sections 58B-1 to 58B-3 which perform a plurality of interpolation processings, respectively, as described below. This selection can be made independently from the selection of the function of the internal-interpolation processing previously described. The calculating section 58B-1 (1st order differential operator section) determines the extending direction of the outside area, which is located outside of the designated area, to be a direction which is same as the inclination of the curve line in the vicinity of the end portion of the designated area. The calculating section 58B-2 (2nd order differential operator section) determines the extending direction of the outside area to be a direction in which the change amount of the inclination of the curve line in the vicinity of the end portion of the designated area is constant. Alternatively, the calculating section 58B-3 (linear operator section) calculates a curve line approximate to the surface form of the object 3 by means of the collinear approximation and determines the extending direction of the outside area to be a direction in which a straight line obtained by the collinear approximation is extended. The external-interpolation processing section 58B is provided with the plurality of calculating sections and thus is capable of calculating an approximate curve line suitable to the form of the object 3. The distance in the extending direction of the outside area located outside of the designated area may be previously determined, or may be changed as appropriate. For example, the user may set the distance to be constant. Alternatively, the distance may be lengthened or shortened depending on, for example, the form inside of the designated area.

An explanation will be given about, for example, a case of extending the approximate curve line in a direction from a first instruction position P1 toward the measurement-start position. In the case shown in FIG. 3, the form of the end portion of the object 3 has such a form that rolls-in (enfolds) toward the back side of the measurement surface. In a case of such a form, the calculating section 58B-2 (2nd order differential operator section) can be used to perform the calculation, thereby making it possible to obtain an approximate curve line more along the form, as compared with a case of using the calculating section 58B-1 or 58B-3.

In the three-dimensional form measuring apparatus 100, as described above, it is possible to expand the designated area with the teaching processing, without increasing the designated location (designated position). Since an adjacent measurement area adjacent to the designated area is generated by the calculation processing, it is possible to decrease the number of the registered location. With this, it is possible to simplify the teaching processing for allowing the user to register the measurement locations and thus to secure the time for allowing the apparatus to be operated. Further, regarding cases of handling objects of which end portions are partially different from each other, and of repeatedly measuring the entire form of each of the objects, it is conventionally necessary to perform the teaching processings in accordance with the respective sizes of the objects. However, in the embodiment, it is possible to perform the measurement based on common teaching processing information, without being affected by the difference in size of the end portion between the objects.

Figure 5:
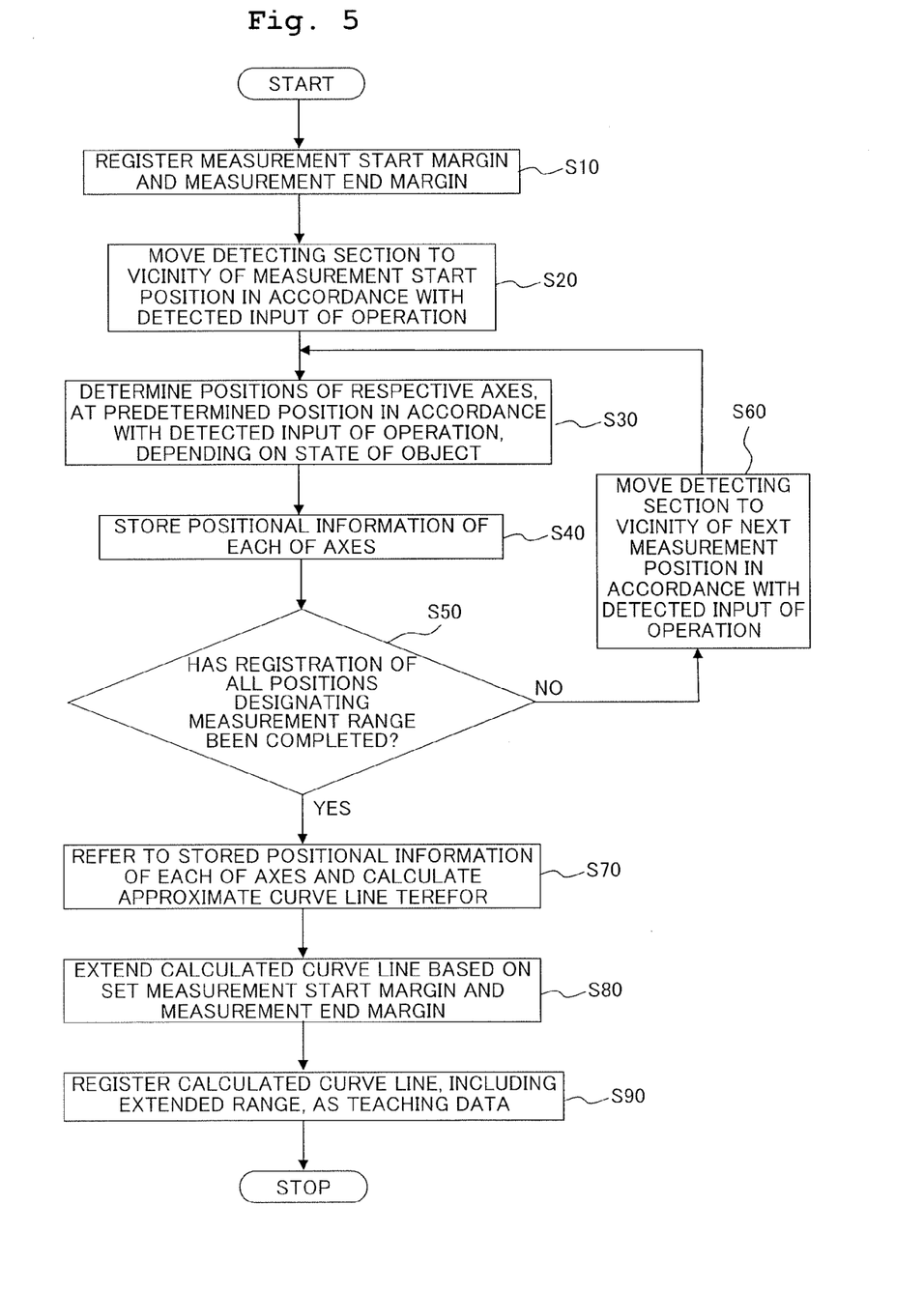
FIG. 5 is a flow chart showing a procedure for simplifying a teaching processing according to the embodiment.

With reference to FIG. 5, an example of the procedure for simplifying the teaching processing will be explained. FIG. 5 is a flow chart showing the procedure for simplifying the teaching processing according to the embodiment. The teaching processing shows a series of processings from generation of a measurement route in three-dimensional form measurement and information showing the procedure to make registration in the storage section 55. At first, the user performs registration of measurement start margin and measurement end margin. Namely, the driving control section 54 detects that measurement start-margin information indicating the measurement start margin and measurement end-margin information indicating the measurement end margin are each inputted, and the driving control section 54 writes and registers, in a storage area provided on the storage section 55, the measurement start-margin information and the measurement end-margin information (step S10).

The driving control section 54 moves the detecting section 20 to the vicinity of the measurement start position of the object 3, in accordance with the detected input of operation. Namely, the driving control section 54 detects that first positional information indicating the first measurement location which is near to the measurement start position is inputted. The moving instruction section 56 controls the driving section 16 to move the detection section 20 relative to and in the vicinity of the measurement start position in a portion-to-be-measured, of the object 3, indicated by the first positional information. Note that the positional information registered in order are stored in the storage section 55 while each of the positional information is associated with identification information indicating the measurement order. Identification information "i" indicating the first measurement location is "1" (step S20).

At a predetermined position in accordance with the detected input of operation, the positions of the respective axes are determined depending on the state of the object 3. Namely, at the predetermined position which is indicated by the positional information in accordance with the detected input of operation and which is associated with the identification information "i", the driving control section 54 determines the positions of the respective axes depending on the state of the object 3. The spacing distance-adjusting section 52 finely adjusts the positions of the respective axes, generates corrected positional information by which the detection position is corrected and determines the position information of the detecting section 20 at the predetermined position so as to increase the detection precision of the state of the object 3 (step S30).

Next, the driving control section 54 causes the positional information of each of the axes to be stored in the storage section 55. Namely, the driving control section 54 causes the corrected positional information, which is generated and determined as the positional information of the detecting section 20 at the position, to be stored in the storage area of the storage section 55, while associating the corrected positional information with the identification information "i" (step S40).

The driving control section 54 judges whether or not the registration has been completed for all of the positions designating the measurement range. Namely, the driving control section 54 detects whether or not the n-th positional information, indicating the n-th measurement location which is near to the measurement end position, has been inputted. In a case that the driving control section 54 judges that input of up to the n-th positional information has not been made, the driving control section 54 updates identification information "i" indicating the next measurement location (step S50).

The user causes the detecting section 20 to move to the vicinity of a next measurement position in the portion-to-be-measured, in accordance with the detected input of operation. Namely, the driving control section 54 detects that the next positional information indicating the next measurement location has been inputted (step S60).

With the judgment in step S50, the area-setting section 58 refers to the stored positional information of each of the axes, and calculated an approximate curve line therefor. Namely, the internal-interpolation processing section 58A in the area-setting section 58 refers to the stored positional information of each of the axes in accordance with the order of the identification information "i", and calculates the approximate curve line therefor. The calculated curve line is calculated as an approximate curve line based on the information about each of the axes (step S70).

The internal-interpolation processing section 58A causes the positional information of each of the axes indicated by the calculated approximate curve line to be stored in the storage area provided on the storage section 55, in accordance with the order by which the detecting section 20 is moved during measurement, while associating the positional information of each of the axes with identification information "j" indicating the measurement location. Note that, however, the identification information "j" is a natural number from "1" to "m". Further, note that a position at which the identification information "j" is "1" corresponds to the first measurement position, and a position at which the identification information "j" is "m" corresponds to the n-th measurement position.

The area-setting section 58 extends the calculated approximate curve line based on the set measurement start margin and measurement end margin. Namely, the external-interpolation processing section 58B in the area-setting section 58 refers to the positional information, which is stored in the storage section 55 and which indicates the measurement location, based on the identification information "j". For example, the external-interpolation processing section 58B refers to positional information indicated by the identification information "j" which is in a range of 1 to (1+Δ1), and extends the calculated approximate curve line based on the set measurement start margin and measurement end margin (step S80). The external-interpolation processing section 58B causes the calculated curve line, including the extended range, to be written and registered in the storage section 55 as the teaching data indicating the measurement procedure and measurement route for measuring the three-dimensional form of the object 3 (step S90). With the procedure as described above, the three-dimensional form measuring apparatus 100 is capable of generating an expanded measurement area based on the information registered as the measurement point of the designated area, and is capable of measuring in the range of the generated measurement area.

As shown in the embodiment described above, the three-dimensional form measuring apparatus 100 is capable of simplifying the setting processing for setting the measurement area with respect to an object in the three-dimensional form measurement of the object. Since the setting of the measurement area is simplified, it is possible to perform the teaching operation for determining the measurement area, which is performed before the measurement, easily and in a short period of time. Further, regarding the measurement start and end positions which are hard to designate in the setting of measurement area, the coordinate-measurement apparatus automatically generates such measurement start and end positions, thereby making it possible to prepare or generate a measurement route (scanning route) based on the generated measurement start and end positions.

Note that the present teaching is not intended to be limited to the respective embodiments described above, and that the present teaching can be changed or modified within a range without deviating from the gist or essential characteristics of the present teaching.

For example, the three-dimensional form measuring apparatus 100 as described above is an example of the form measuring apparatus (coordinate measuring apparatus) according to the present teaching; and it is not necessarily indispensable that the form measuring apparatus according to the present teaching has a similar configuration as that of the three-dimensional form measuring apparatus 100. It is sufficient that the form measuring apparatus according to the present teaching has the configuration corresponding at least to the detecting section 20 and the area-setting section 58 of the three-dimensional form measuring apparatus 100. Regarding configuration other than that corresponding to the detecting section 20 and the area-setting section 58, it is allowable to arrange the other configuration as appropriate.

Further, for example, the user may determine completion of the registration of the measurement locations in the designated area as shown above, at each of the registered locations, and the user may judges whether or not information indicating "registry completed" has been inputted.

Furthermore, it is also possible that the detecting section 20 is configured to include the SFF probe 20B and/or the contact probe 20C, rather than configured of the optical probe 20A, in a similar manner as the case that the detecting section 20 is configured of the optical probe 20A. For example, it is allowable to configure the detecting section 20 to include a plurality of problem such as the optical probe 20A, the SFF probe 20B.

Further, the detecting method for obtaining the registered measurement locations in the designated area and the method for measuring the coordinates may be different from each other. For example, it is allowable to calculate the form of the designated area by using the CAD data stored in the storage section, to thereby obtain the form of the object. For example, it is allowable to determine the arrangement of the object with respect to the base 2 and to use the CAD data to determine the designated area. For example, in a case that the apparatus is provided with the optical probe 20A and the SFF probe 20B of the detecting section 20, it is allowable to determine the registered locations in the designated area with the optical probe 20A and to measure the object with the SFF probe 20B.

Note that the three-dimensional form measuring apparatus 100 described above has a computer system inside thereof. Further, the processing procedure for providing traffic situation described above is stored in a computer-readable recording medium in a form of computer program, and the above-described processing is performed when the computer reads out and execute the program. Here, the term "computer-readable recording medium" includes a magnetic disk, a magneto-optical disk, a CD-ROM, a DVD-ROM, a semiconductor memory, etc. Further, it is allowable to transmit the computer program to the computer via a communication line and to allow the computer receiving the transmission to execute the program. In such a case, a hard disk, a semiconductor memory, etc., in which the program is stored in the computer which has received the transmission corresponds to the computer-readable recording medium. Note that in the present teaching, it is not necessarily indispensable that the form measuring apparatus is provided with a computer system provided therein. It is allowable that a computer system, which is provided independently from the apparatus body of the form measuring apparatus, is connected to the form measuring apparatus such that the computer system and the form measuring apparatus can communicate with each other, and that the apparatus body and the computer system construct, as a whole, the form measuring apparatus.

[Structure Manufacturing System]

Figure 6:
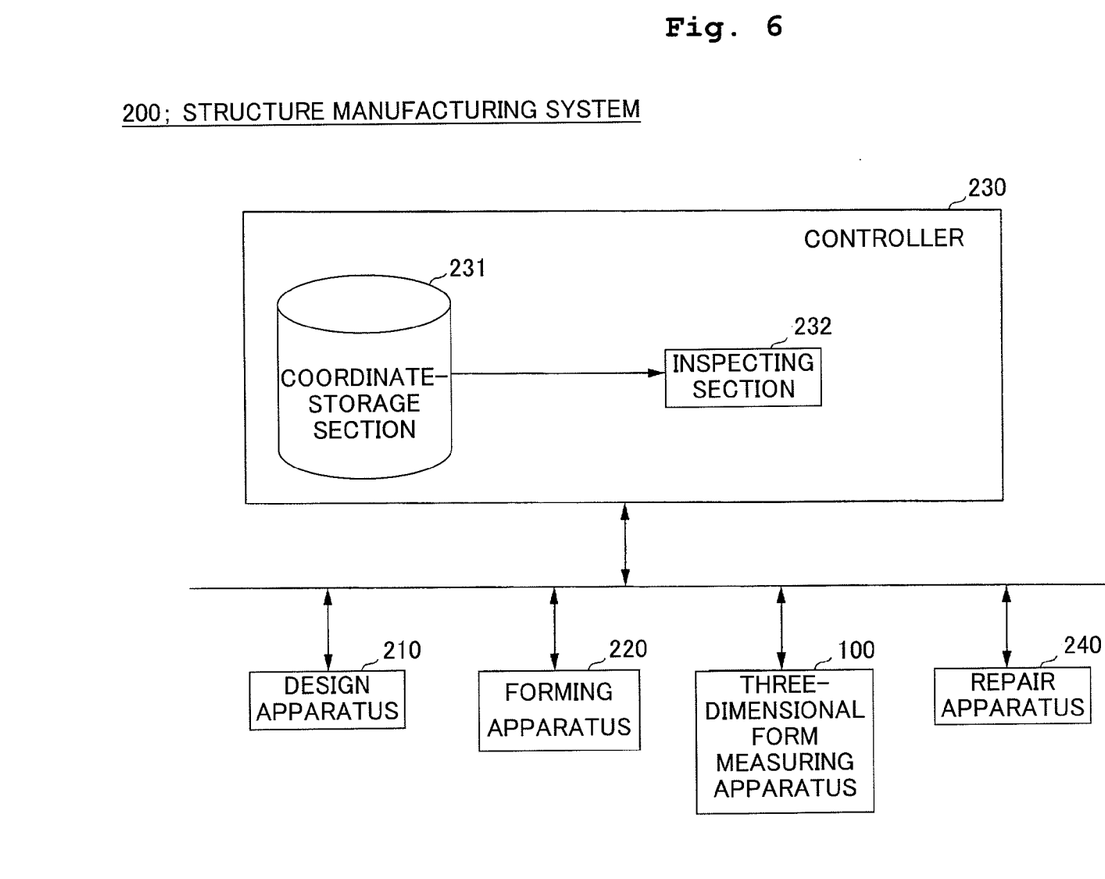
FIG. 6 is a block diagram showing the configuration of a structure manufacturing system.

Next, an explanation will be given about a structure manufacturing system provided with the three-dimensional form measuring apparatus 100 of the embodiment. FIG. 6 is a block diagram showing the configuration of a structure manufacturing system 200. The structure manufacturing system 200 is provided with the three-dimensional form measuring apparatus 100 in the first embodiment, a design apparatus 210, a shape forming apparatus 220, a controller (inspection apparatus) 230, and a repair apparatus 240.

The design apparatus 210 creates design information with respect to the form of a structure, and transmits the created design information to the shape forming apparatus 220. Further, the design apparatus 210 causes the created design information to be stored in a coordinate-storage section 231 (to be described later on) of the controller 230. Here, the term "design information" is information indicating coordinates of each position of the structure.

The shape forming apparatus 220 creates the structure based on the design information inputted from the design apparatus 210. Forming steps of the shape forming apparatus 220 include, for example, casting, forging, cutting, etc.

The three-dimensional form measuring apparatus 100 measures the coordinates of the created structure as explained with the above-described embodiment, and transmits information (form information) indicating the measured coordinates to the controller 230.

The controller 230 is provided with a coordinate-storage section 231 and an inspecting section 232. The design information is made to be stored by the design apparatus 210 in the coordinate-storage section 231, as described above. The inspecting section 232 reads the design information from the coordinate-storage section 231. The inspecting section 232 compares the information (form information) which indicates the coordinates and which is received from the three-dimensional form measuring apparatus 100 and the design information which is read from the coordinate-storage section 231.

The inspecting section 232 judges as to whether or not the structure is created in accordance with the design information based on the comparison result. In other words, the inspecting section 232 judges as to whether or not the created structure is a nondefective structure. In a case that the structure is not created in accordance with the design information, the inspecting section 232 judges as to whether or not the structure is repairable. In a case that the structure is repairable, the inspecting section 232 calculates a defective portion and a repair amount based on the comparison result to transmit, to the repair apparatus 240, information indicating the defective portion and information indicating the repair amount.

The repair apparatus 240 processes the defective portion of the structure based on the information indicating the defective portion and the information indicating the repair amount received from the controller 230.

Figure 7:
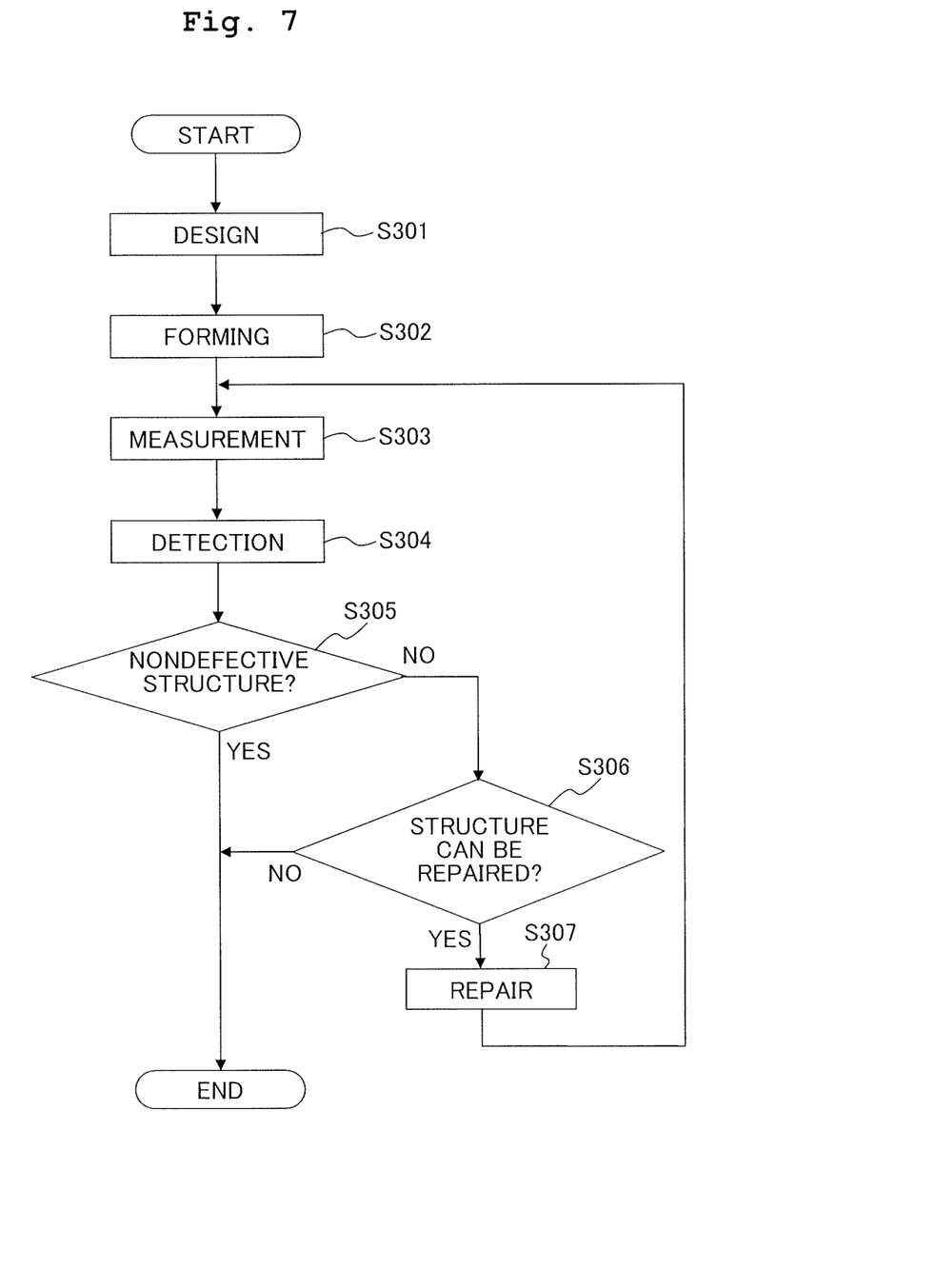
FIG. 7 is a flow chart showing a processing performed by the structure manufacturing system.

FIG. 7 is a flow chart showing the flow of processing by the structure manufacturing system 200. At first, the design apparatus 210 creates the design information with respect to the form of the structure (step S301). Next, the shape forming apparatus 220 creates the structure based on the design information (step S302). Next, the three-dimensional form measuring apparatus 100 measures the form of the created structure (step S303). Next, the inspecting section 232 of the controller 230 inspects as to whether or not the structure is created in accordance with the design information by comparing the form information obtained from the three-dimensional form measuring apparatus 100 with the design information (step S304).

Next, the inspecting section 232 of the controller 230 judges as to whether or not the created structure is nondefective (step S305). In a case that the created structure is judged to be nondefective (step S305: Yes), the structure manufacturing system 200 completes the process. On the other hand, in a case that the created structure is judged to be defective (step S305: No), the inspecting section 232 of the controller 230 judges as to whether or not the created structure is repairable (step S306).

In a case that the created structure is judged to be repairable (step S306: Yes), the repair apparatus 240 executes reprocessing of the structure (step S307) and then the process is returned to the step S303. On the other hand, in a case that the created structure is judged to be not repairable (step S306: No), the structure manufacturing system 200 completes the process. With this, the processing of the flow chart is finished.

As described above, since the three-dimensional form measuring apparatus 100 in the first embodiments is capable of accurately measuring the coordinates of the structure, the structure manufacturing system 200 is capable of judging as to whether or not the created structure is nondefective. Further, in a case that the structure is defective, the structure manufacturing system 200 is capable of executing the reprocessing of the structure to repair the structure.

Note that the repair process executed by the repair apparatus 240 in the embodiment can be replaced by a process in which the shape forming apparatus 220 re-executes the shape forming process. When doing so, in a case that the inspecting section 232 of the controller 230 judges that the repair can be made, the shape forming apparatus 220 re-executes the shape-forming process (forging, cutting, etc.). Specifically, for example, the shape forming apparatus 220 cuts a portion in the structure which should be originally cut but not has been cut. By doing so, the structure manufacturing system 200 is capable of manufacturing the structure accurately.

The present teaching is applicable to a structure manufacturing system capable of judging whether or not a manufactured structure is nondefective.

What is claimed is:

1. A form measuring apparatus configured to perform measurement of a surface form of a surface of an object having a three-dimensional form, the apparatus comprising:
   a detecting section which is configured to perform detection of the surface form of the object having the three-dimensional form; and
   an area-setting section which is configured to set, as a measurement area, an outside area located outside of a designated area, based on form information of a form of the designated area,
   wherein the detecting section is configured to perform the detection at first for the measurement area located outside of the designated area and thereafter to perform the detection for the designated area.

2. The form measuring apparatus according to claim 1, wherein the area-setting section is configured to set the measurement area based on the form information, of the designated area, which has been previously measured.

3. The form measuring apparatus according to claim 1, wherein the area-setting section is configured to set, as the measurement area, an adjacent area adjacent to the designated area.

4. The form measuring apparatus according to claim 1, wherein the area-setting section includes an external-interpolation processing section which is configured to calculate an outside area located at outside of the designated area based on a form measurement data obtained by the measurement.

5. The form measuring apparatus according to claim 1, wherein a range of the outside area located outside of the designated area has been previously determined.

6. The form measuring apparatus according to claim 4, wherein the external-interpolation processing section includes any one of a first order differential operator section, a second order differential operator section and a linear operator section each of which is configured to calculate a curve line approximate to the surface form of the object based on the form measurement data in the vicinity of an end portion of the designated area and which is configured to determine an extending direction of the outside area, based on the calculated curve line;
the first order differential operator section is configured to determine the extending direction of the outside area to be a direction which is same as inclination of the curve line;
the second order differential operator section is configured to determine the extending direction of the outside area to be a direction in which a change amount of the inclination of the curve line is constant; and
the linear operator section is configured to calculate the curve line approximate to the surface form of the object by collinear approximation, and to determine the extending direction of the outside area to be a direction in which a straight line obtained by the collinear approximation is extended.

7. The form measuring apparatus according to claim 4, wherein the external-interpolation processing section calculates a distance by which the measurement area is to be extended along the calculated curve line, within a range which is any one of:
a range defined by a distance from an end of the designated area up to a predetermined distance which has been previously determined;
a range defined by a distance until arriving at a predetermined limit area which has been previously determined, and
a range up to a position at which a limit position is included, the limit position being a position at which the object is capable of being present and which is calculated based on form information obtained from the form of the object in the designated area.

8. The form measuring apparatus according to claim 4, wherein the area-setting section includes an internal-interpolation processing section which is configured to obtain the form measurement data by internal-interpolation processing based on a form measurement data detected while moving the detecting section relative to and along the surface of the object; and
the external-interpolation processing section is configured to perform the external-interpolation processing based on the obtained form measurement data and based on the form measurement data obtained by the internal-interpolation processing.

9. The form measuring apparatus according to claim 1, further comprising a driving mechanism which is configured to drive, in an orthogonal coordinate system defined by mutually orthogonal X-axis, Y-axis and Z-axis, the detecting section relative to the object in a direction of the X-axis, a direction of the Y-axis, and a direction of the X-axis.

10. The form measuring apparatus according to claim 9, wherein the driving mechanism is configured to rotate the detecting section relative to the object about at least one of the X-axis, Y-axis and Z-axis.

11. The form measuring apparatus according to claim 1, wherein the detecting section includes a detecting mechanism which includes at least one of:
an optical cutting type detecting section which is configured to obtain a form measurement data by the measurement based on a shading pattern formed on the surface of the object with a line-shaped light projected onto the object;
an obtained image transforming type detecting section which is configured to obtain the form measurement data based on an image data obtained by taking an image of the form of the object; and
a contact type detecting section which is configured to obtain the form measurement data by contacting the object.

12. The form measuring apparatus according to claim 1, further comprising an input section which is configured to be input information indicating a state for arranging the detecting section in the designated area.

13. A form measuring method comprising:
performing detection of a surface form of a surface of an object having a three-dimensional form;
setting, as a measurement area, an outside area located outside of a designated area, based on form information of a form of the designated area;
detecting at first for the measurement area located outside of the designated area and thereafter detecting for the designated area.

14. The form measuring method according to claim 13, wherein the measurement area is set based on the form information of the designated area which has been previously measured.

15. The form measuring method according to claim 13, wherein an adjacent area adjacent to the designated area is set as the measurement area.

16. The form measuring method according to claim 13, wherein the measurement area is set as the outside area located outside of the designated area based on design information of the designated area.

17. The form measuring method according to claim 13, wherein the measurement area which is located outside of the designated area includes a first area and a second area along a scanning direction of the detection; and
the detection is performed for the first area, the measurement area, and the second area in this order along the scanning direction.

18. A method for manufacturing a structure, comprising:
preparing design information regarding a form of the structure;
manufacturing the structure based on the design information;
measuring a form of the manufactured structure by using the form measuring method as defined in claim 13 to obtain form information about the form of the manufactured structure; and
performing inspection by comparing the form information with the design information.

19. The method for manufacturing the structure according to claim 18, further comprising performing reprocessing of the structure based on a result of the comparing the form information with the design information.

20. The method for manufacturing the structure according to claim 19, wherein the performing of the reprocessing is re-execution of the manufacturing of the structure.

21. The method for manufacturing the structure according to claim 20, wherein the performing of the reprocessing is repairing a defective portion of the structure, based on the result of the comparing the form information with the design information.

22. The form measuring apparatus according to claim 2, wherein the area-setting section is configured to set the measurement area by expanding the designated area.

23. The form measuring apparatus according to claim 1, wherein an end of the object is arranged between the designated area and a starting point of the detection in the measurement area.

24. The form measuring apparatus according to claim 2, wherein the designated area has been previously measured by using a detection system different from the detection section.

25. The form measuring apparatus according to claim 2, wherein the designated area has been previously measured by using a plurality of detection systems different from the detection section.

26. The form measuring apparatus according to claim 1, wherein the area-setting section is configured to set as the measurement area based on form information of design information in the designated area.

27. The form measuring apparatus according to claim 1, wherein the area-setting section is configured to determine an extending direction in which the designated area is extended toward the outside area, based on form information of the designated area.

* * * * *